Patented June 20, 1950

2,512,079

UNITED STATES PATENT OFFICE 2,512,079

PRODUCTION OF TITANIUM OXIDE PIGMENTS

Alfred John Werner, Newport, Del., assignor to E. I. du Pont de Nemours & Company, Wilmington, Del., a corporation of Delaware No Drawing. Application May 29, 1947, Serial No. 751,476

12 Claims. (Cl. 23—202)

This invention relates to the preparation of titanium oxide pigments by the vapor phase oxidation of titanium halides. More particularly it concerns the improvement of such pigments by treatment with a compound or compounds of boron.

The titanium oxide pigments of commerce have been usually prepared by the so-called "sulphate process." This comprises attacking titaniferous ores with sulphuric acid; hydrolyzing the resulting solution to precipitate hydrated titania; filtering, washing and calcining the said hydrate; and finishing by grinding with or without treatment by various surface modifying agents. The $TiO_2$ product is useful in many widely different industries including paint, paper, linoleum, rubber, etc. The fact that this sulphate process involves the batch-wise handling of large quantities of solutions, renders it quite expensive. It is necessary to employ wet-blending techniques throughout the operation, with their consequent complicated and costly equipment requirements.

Recent improvements in titanium technology make possible the preparation of $TiO_2$ pigments with substantial reduction of the above difficulties. The new method involves treatment of the ore with gaseous halogen such as chlorine and oxidation of the resulting titanium chloride in the vapor phase. This "chloride process" is regarded as more suitable for continuous operations. As there are no cumbersome solutions to be handled in its initial phases, it is adapted to more desirably streamlined plant design. The handling of the anhydrous $TiCl_4$, rather than the sulphate solution of the prior art, makes for compactness and decreased plant investment. Much work has been done on overcoming the difficulties accompanying such radical changes in the industry, and these and many difficulties inherent in the sulphate process are now avoided. The conversion of $TiCl_4$ to $TiO_2$ by oxidation has been discussed in the prior art and specifically in U. S. Patents 1,931,381, 2,240,343, and 2,340,610. The oxidation is carried out at high temperatures (flame temperature in excess of about 1000° C.) and is represented by the reaction:

$$TiCl_4 + O_2 \rightarrow TiO_2 + 2Cl_2$$

There are still some disadvantages to be found in the new method, however. The $TiO_2$ product must often be after-treated with metal salt solutions to develop various desired properties. The pigment also contains free halogen gas adsorbed on the particles, rendering it very acidic. The method presently used to remove this gas is to neutralize with a base such as sodium hydroxide solution. In any of these after-treatments, the pigment is slurried in the solution, filtered, dried, and calcined. It must then be ground mechanically. This is disadvantageous because such grinding does not reproduce the original particle size. The final product is necessarily of coarser texture than the $TiO_2$, which as formed by the vapor phase process is of most desirably fine particle size. Another difficulty specific to the problem of deacidifying the product is that the usual neutralizing reagents employed to remove the adsorbed halogens have a deleterious effect on pigment color, and on the gloss and heat-resistance of paints and enamels made from the treated pigments.

To overcome the above and other disadvantages of prior art techniques is a prime object of this invention. Another object is to reduce the acidity of the $TiO_2$ pigment resulting from the vapor phase oxidation of titanium halides. Yet another object is to effect such neutralization without adversely affecting other pigment properties. A further object is to minimize the necessity of grinding the finished pigment. Other objects include the production of a titanium dioxide pigment of desirable durability characteristics by simple commercial operating procedures.

The above and other objects are attained by the practice of the present invention which broadly comprises adding an oxygen compound of boron to the oxidation product of titanium tetrachloride (i. e., titanium dioxide having chlorine adhering to or adsorbed thereon) and separating the boron-containing titanium dioxide from the resulting non-adhering chlorine-containing products.

In a preferred embodiment of the invention, a dry $TiO_2$ product is made by the continuous oxidation of $TiCl_4$, by combining a gaseous stream of the same with a stream of oxygen-containing gas, while maintaining a reaction temperature in excess of 1000° C. and while observing the precautions outlined in the above-mentioned patents. The oxidation products, comprising solid particles of $TiO_2$ of pigment fineness suspended in a chlorine-containing gas, are rapidly quenched to avoid particle growth, and mechanical separation of the solids from the gas is effected. The separated pigment is then mixed with 1 part by weight of boric acid for each 100 parts by weight of $TiO_2$, and the whole heated in a rotating tube to a temperature within the range of 500° to 700° C. The final titanium oxide pigment is of enhanced softness and fineness, the natural acidity of the TiO2 has been overcome (pH of 7 resulting by this procedure) and other pigment properties have been greatly improved.

Another preferred embodiment comprises the wet treatment of TiO2 produced from TiCl4 by a vapor phase reaction, wherein the titanium dioxide, after separation from the chlorine-containing gases, is slurried in water and mixed with a small proportion of boric acid or a water-soluble borate. After thorough admixture of the materials, the pH is adjusted to 7 by the use of ammonia or other alkali, if needed, and the whole is filtered, washed and dried. This variation, applying an oxygen-compound of boron by a wet-blending technique, does not require the heat treatment mentioned above as preferred when operating in the absence of water. The TiO2 product in this instance is of similar fine texture, and the usual agglomeration of particles caused by prior art slurry treatments does not occur, so that substantially no mechanical grinding is necessary in order to have a product which is readily incorporated in paint vehicles to give quality paints. The chlorine which adhered to the pigment prior to the treatment has been removed, and the poor durability due to its presence has been overcome. I believe that the improved product has adhering thereto boric acid or an oxide of boron.

Boron oxide is the essential and effective constituent in the present invention. It may itself be used as the treating agent, in either the best known sesquioxide form, or in the form of one of the lesser known suboxides. Any compound which on decomposition, either thermally or by means of ammonia, an acid or other neutrality adjusting reagent, yields boric oxide or boric acid may also be used, particularly in the method which employs wet treatments. This includes the ortho-, meta-, or tetra-boric acids and the corresponding alkali metal borates. Boron oxide or boric acids may be used in conjunction with metals, which apparently react to form the corresponding metal borate or some complex salt. Boron chemistry is not thoroughly understood, so that the true nature of these reactions cannot be ascertained. It is obvious that more than one compound of boron may be used in a given treatment if desired.

The efficacy of the treatment will in large measure be determined by the quantity of the boron compounds employed. Naturally, the less used, the less the effect on the pigment, within certain practical limits. It is generally true that from about 0.05% to 10% as boron oxide, by weight of the TiO2, is sufficient to accomplish the desired results; and often 0.1% to 5% will fully neutralize the TiO2 and impart the desired fineness and softness to it.

The temperatures to which the treated titanium oxide is heated are critical only as to maxima. Essentially any temperature is sufficient which will implement decomposition of the boron compounds and consequent formation of boron oxide. This will of course depend on the particular boron compound chosen. When boric acid is used in the dry type of treatment, for example, best results are obtained if the mixture is heat-treated for a brief period at say 500° to 650° C. It is thought that the heat effects at least partial volatilization of the boric acid, that the resulting vapors pass through and around the mass of pigment to allow more intimate contact and more thorough commingling therewith than could be achieved by mere mechanical mixing of the two as solids, and that finally the acid is dehydrated, losing water to form the desired boron oxide. At no time should the heat exceed roughly 700° to 750° C. At temperatures very much higher than these, the TiO2 is adversely affected, losing brightness, color and other pigment properties. When the boron compound is applied by a wet-blending technique, of course no such heating at all is required. The boron compound is distributed throughout the solution and may be adsorbed on the surface of the titanium dioxide particles. The mass may then be dried by slight heating if desired, but this is unimportant.

My improved process is specifically designed to correct the inherent weaknesses of pigment produced by the vapor phase reaction of titanium tetrachloride with a decomposition agent, either water or oxygen. The pigment thus formed is acidic in character, as explained above, and it is believed that my treatment with an oxygen-containing boron compound assists in the removal of the adsorbed chlorine or basic titanium chloride in a manner not well understood. It appears, however, that the boron oxide becomes adsorbed on the titanium oxide to replace the chlorine-containing surface layer, thereby decreasing the acidity of the product. When the boron reagent is added as dry boric acid and followed by heat treatment at 500° to 700° C., as previously discussed, the boron compound apparently becomes thoroughly distributed throughout the pigment due to the appreciable vapor pressure of boric acid under these conditions. The uniform distribution of the resulting boron oxide is thus effectively accomplished, but the process at the same time avoids the more expensive wet treatments heretofore thought necessary.

The following examples are given simply to illustrate this invention and are not to be regarded as in limitation thereof:

NOTE.—The various tests for pigment properties hereinafter referred to are explained in U. S. Patent 2,253,551, with the exception of the baking discoloration test. This last is determined by incorporating the pigment in a standard alkyd resin vehicle, coating a panel with the resulting paint, and baking the panel at 180° C. for 1¼ hours. Any changes in color due to the action of heat are compared with those of a paint compounded with a standard pigment of high quality which has been similarly baked. This control is arbitrarily given a number rating of 18. The test paint is penalized 1 point for the least visually detectable discoloration as compared with the control. Conversely, if the control paint is observed to have discolored more than the one under test, the latter is given a rating correspondingly higher than 18. The best grades of paint pigments generally have a BD rating of 14 to 20.

*Example I*

TiCl4 was vaporized and superheated to 915° C. Air was separately heated to 935° C. The two gases were rapidly mixed in a silica reaction chamber, the TiCl4 vapors entering the said chamber at the rate of 31.7 mols per hour and the air at 157 mols per hour. The reactor temperature was 1065° C., and the reactants remained therein .20 second. TiO2 was formed as finely divided particles suspended in the by-product chlorine-containing gas. It was separated therefrom by passage through a cyclone separator. The collected product was mixed in dry state with boric acid, the proportions used being 1.8 parts by weight of H3BO3 per 100 parts of TiO2. This was equivalent to about a 1% B2O3 treatment. The mixture was heated for one hour at 600° C., and its pigment properties were then tested. The pH was 7.6, the color 20:2y, tinting strength 180, oil absorption 21.9, and baking discoloration 18. The pigment was particularly noteworthy for its extreme fineness and softness. No mechanical grinding was necessary, but it was ready for immediate use in coating compositions or the like.

A second quantity of TiO₂ was prepared by the above method, but no boron oxide treatment was given to it. Its pigment properties were as follows: pH 4.7, color 12:5y, tinting strength 181, oil absorption 20.5, and baking discoloration 12: Very Pink.

*Example II*

TiO₂ was prepared by a vapor phase oxidation process as in Example I. It was then slurried in water in the proportions of one part by weight of TiO₂ to five parts by weight of water. To this slurry was added boric acid in the amount of 0.1% by weight of the TiO₂, calculated as B₂O₃. The boric acid dissolved in the slurry and was thoroughly mixed with the TiO₂ by mechanical agitation. The mass was heated to 70° C. and neutralized to pH 8.0 with ammonia. A solution of zinc sulphate was then added in a quantity calculated to give 0.23% ZnO by weight of the TiO₂. The slurry thickened immediately and flocculated. It was filtered, and the resulting cake was washed and allowed to dry. The final pigment product required no particular mechanical grinding as does normal prior art wet-treated pigment, but instead fell apart at the touch into a finely divided, soft material. This had a pH of 6.0, a color of 14:2y, a tinting strength of 195, oil absorption of 19, and baking discoloration of 17.

It would seem that the thickening and flocculation of the slurry upon addition of the zinc sulphate is evidence of some reaction between the zinc and the boric acid. Possibly this might be represented by the equation:

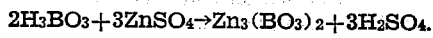

$$2H_3BO_3 + 3ZnSO_4 \rightarrow Zn_3(BO_3)_2 + 3H_2SO_4.$$

However, few orthoborate salts are known, and the zinc compound has never been conclusively identified.

*Example III*

TiCl₄ vapors and pure oxygen containing 1% of water vapor were preheated separately to 900° C. The two hot gases were then rapidly commingled, in the ratio of 1 mol of TiCl₄ to 1.1 mols of O₂. Mixing was carried out in a silica reactor maintained at a temperature of 1000° C. As in the previous experiments, a suspension of finely-divided TiO₂ pigment in chlorine-containing tail gases resulted. This pigment was found by X-ray analysis to be 100% rutile. After the TiO₂ had been separated from the tail gases by conventional means, it was mechanically mixed with dry boric acid sufficient to provide a 3% by weight treatment of boron oxide. This mixture was heat-treated for 1 hour at 500° C. The resulting pigment was distinctive for its unusual fineness and softness, similar to the products of Examples I and II. Its color was 20:0, tinting strength 184, pH 7.5, oil absorption 22, and baking discoloration 14.

The reason for the effect of these boron compounds is actually unknown, although I have postulated a possible theory. Whatever the explanation, certainly it is novel and unexpected that the addition of an acid should serve to neutralize an already acid material, that boric acid or boric oxide should have an alkaline effect in this situation. Similarly, the reason that the boron compounds render TiO₂ pigment so extremely fine and soft is also unknown. Besides these advantages of neutralization and of improvement in pigment texture, a further one, as shown by the previous examples, is that the pigment loses some of its yellow cast and gains a bluish tinge which is considered highly desirable in the trade. Additionally, the pigment properties which boron oxide does not actually improve, it does not materially affect adversely; hence its action is wholly constructive. Many other benefits to be derived from this new process, as previously discussed or implied, will be obvious.

As explained above, the vapor phase oxidation of titanium tetrachloride at a high temperature, yields a titanium dioxide product of pigment fineness, provided the proper precautions are taken in carrying out the reaction. The product is deficient for use as a pigment without removal of adsorbed chlorine, which adheres to the extent of about .02% when the product is separated from the chlorine-containing gases resulting from the conversion, even after reheating to a temperature of about 600° C. in the presence of air. Such a product will have a pH value of about 5 which is objectionable for many pigment uses. My process is designed to correct this product weakness; by the simple expedient of adding boric acid during the above-mentioned subsequent heat treatment, I am able to obtain a product with a pH of about 7.

An explanation of why the addition of boric acid to the chlorine-containing product followed by heat treatment will raise the pH value cannot be offered with certainty, but it appears that boric oxide becomes distributed over the surface of the pigment and replaces the adsorbed chlorine. A similar product and a similar result is found when the vapor phase reaction product containing the chlorine is admixed with water and is then treated with a boron compound such as boric acid or sodium borate. It is believed that a similar commingling of the boron compound with the pigment particles is thereby effected and with the same result. Either treatment gives the intimate association and the improved titanium dioxide product.

In the dry heat treatment process, I prefer to add boric acid (H₃BO₃) as the oxygen-containing boron compound. During the heat treatment, the boric acid becomes dehydrated, and it is well known that a considerable quantity of a boron compound is volatilized during this operation. This assists in distributing the boron throughout the pigment and permits the use of smaller amounts of the boron compound for the treatment. When using boric oxide, it is desirable to heat above the melting point of the oxide, which is 577° C., in order to distribute the boron throughout the pigment mass.

My process is particularly useful in the production of rutile-titanium dioxide through the vapor phase oxidation of titanium tetrachloride, since this process permits the production of a pigment of the higher refractive index at substantially the same cost as for the anatase modification titanium dioxide pigment. Chlorine is adsorbed on either form of crystalline TiO₂, and accordingly the process is directed to the improvement of either type of titanium dioxide pigment when produced by operations which give a pigment having a low pH value due to adsorbed chlorine.

Although the invention has been described in connection with the details of certain embodi-

I claim:

1. In a process for the production of pigment titanium dioxide by the oxidation of titanium tetrachloride, the step of commingling with the titanium dioxide oxidation product containing adsorbed chlorine a minor amount of an oxygen-compound of boron, and heating the resulting mixture at a temperature not to exceed 750° C.

2. In a process for the production of titanium dioxide pigment from titanium tetrachloride through an oxidation reaction, the step of displacing the chlorine adsorbed on the $TiO_2$ solid reaction product from such oxidation by an oxygen-containing compound of boron, by mixing a sufficient quantity of said boron compound with said $TiO_2$ product and heating the resulting mixture at a temperature ranging from 500–750° C.

3. A process for the production of titanium dioxide pigment which comprises converting vaporous titanium tetrachloride to titanium oxide at an elevated temperature, by reaction with an oxygen-containing gas, cooling the resulting suspension and separating the titanium dioxide from the chlorine-containing gases, mixing from about .05% to 10%, based on the weight of the $TiO_2$ and calculated as boron oxide, of an oxygen-containing boron compound with the recovered titanium dioxide and heating the admixture to a temperature not in excess of 750° C.

4. In a process for the production of titanium dioxide pigment from titanium tetrachloride by an oxidation reaction, the steps of adding from .05% to 10% by weight, based on the $TiO_2$ and calculated as boron oxide, of an oxygen-containing compound of boron to the titanium dioxide reaction product having chlorine adsorbed thereon and subsequently heating the mixture to a temperature within the range of 500° to 700° C.

5. A process for the production of titanium dioxide pigment which comprises converting vaporous titanium tetrachloride to titanium dioxide at an elevated temperature by reaction with an oxygen-containing gas, cooling the resulting suspension, separating the titanium dioxide from the chlorine-containing gases and displacing the chlorine adsorbed on the titanium dioxide particles by intimately associating therewith from about .1% to 5%, based on the weight of the $TiO_2$ and calculated as boron oxide, an oxygen-containing compound of boron, and heating the resulting mixture to a temperature not exceeding 700° C.

6. In a process for the production of pigment titanium dioxide by the vapor phase conversion of titanium tetrachloride to titanium dioxide, the step of adding from .05% to 10%, based on the $TiO_2$ under treatment and calculated as boron oxide, of boric acid to the $TiO_2$ product containing adsorbed chlorine, which is obtained in said conversion, and subsequently heating the whole to a temperature not exceeding 700° C.

7. A process for the removal of adsorbed chlorine from the titanium dioxide produced by the vapor phase oxidation of titanium tetrachloride which comprises the addition of from .05% to 10%, by weight of the $TiO_2$, and calculated as boron oxide, of an oxygen compound of boron and the heating of the admixture to a temperature within the range of 500 to 700° C.

8. A process for the removal of adsorbed chlorine from titanium dioxide resulting from the vapor phase oxidation of titanium tetrachloride which comprises wetting the titanium dioxide with an aqueous solution of an oxygen-containing compound of boron, to associate with said $TiO_2$ from about .05% to 10% of said compound, said percentage amount being based on the $TiO_2$ and calculated as boron oxide, dewatering and drying the resulting product at an elevated temperature not exceeding 700° C.

9. In a process for the production of pigment titanium dioxide by the vapor phase conversion of titanium tetrachloride to titanium dioxide, the step of adding from .1% to 5% of boric acid to the $TiO_2$ product containing adsorbed chlorine resulting from said vapor phase conversion, and thereafter heating the so-treated $TiO_2$ product to a temperature ranging from 500–650° C.

10. A method for neutralizing and removing adsorbed chlorine from the $TiO_2$ product resulting from the vapor phase oxidation of titanium tetrachloride which comprises intimately associating with said $TiO_2$ product from about .05% to 10%, based on the weight of the $TiO_2$ and calculated as boron oxide, of an oxygen-containing compound of boron, and then decomposing said boron compound to intimately associate boron oxide with said $TiO_2$ by heating the boron compound-$TiO_2$ mixture to temperatures ranging from 500–700° C.

11. A method for neutralizing and removing adsorbed chlorine from the $TiO_2$ product which results from the vapor phase oxidation of titanium tetrachloride which comprises adding to said $TiO_2$ product from about .1% to 5% of boric acid, based on the weight of said $TiO_2$ and calculated as boron oxide, and then decomposing said boric acid to intimately associate boron oxide with said $TiO_2$ product by heating the boric acid-$TiO_2$ mixture to temperatures ranging from 500–700° C.

12. A method for neutralizing and removing adsorbed chlorine from the $TiO_2$ product which results from the vapor phase oxidation of titanium tetrachloride which comprises adding to said $TiO_2$ product from about .1% to 5% of boric acid, based on the weight of said $TiO_2$ and calculated as boron oxide, and then heating the boric acid-$TiO_2$ mixture to temperatures ranging from 500–650° C. for a period of time sufficient to effect decomposition of said boric acid and association of boron oxide with said $TiO_2$.

ALFRED JOHN WERNER.

REFERENCES CITED

The following references are of record in the file of this patent:

UNITED STATES PATENTS

| Number | Name | Date |
|---|---|---|
| 2,055,221 | Ravnestad | Sept. 22, 1936 |

Certificate of Correction

Patent No. 2,512,079  June 20, 1950

ALFRED JOHN WERNER

It is hereby certified that error appears in the printed specification of the above numbered patent requiring correction as follows:

Column 7, line 53, before the word "an" insert *of*;

and that the said Letters Patent should be read with this correction therein that the same may conform to the record of the case in the Patent Office.

Signed and sealed this 12th day of September, A. D. 1950.

[SEAL]

THOMAS F. MURPHY,
*Assistant Commissioner of Patents.*